(12) United States Patent
Moritomi et al.

(10) Patent No.: US 8,278,392 B2
(45) Date of Patent: Oct. 2, 2012

(54) PROCESS FOR PRODUCING PROPYLENE RESIN COMPOSITION

(75) Inventors: Satoru Moritomi, Chiba (JP); Takashi Sanada, Ichihara (JP); Mitsuyoshi Shimano, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/656,841

(22) Filed: Feb. 17, 2010

(65) Prior Publication Data

US 2010/0152385 A1    Jun. 17, 2010

Related U.S. Application Data

(62) Division of application No. 11/100,629, filed on Apr. 7, 2005.

(30) Foreign Application Priority Data

Apr. 13, 2004  (JP) ................... 2004-117577

(51) Int. Cl.
*C08F 297/08*    (2006.01)
*C08F 4/00*     (2006.01)

(52) U.S. Cl. ........................ 525/232; 525/240

(58) Field of Classification Search .......... None
See application file for complete search history.

(56) References Cited

U.S. PATENT DOCUMENTS

| | | | |
|---|---|---|---|
| 4,975,492 | A | 12/1990 | Kondo et al. |
| 5,840,389 | A | 11/1998 | Asanuma et al. |
| 6,350,828 | B1 | 2/2002 | Takaoka et al. |

FOREIGN PATENT DOCUMENTS

| | | |
|---|---|---|
| JP | 58-007439 | 1/1983 |
| JP | 5-186600 | 7/1993 |
| JP | 11-124439 | 5/1999 |
| JP | 2001-150429 | 6/2001 |
| JP | 2003301086 A * | 10/2003 |

* cited by examiner

*Primary Examiner* — Irina S Zemel
(74) *Attorney, Agent, or Firm* — Foley & Lardner LLP

(57) ABSTRACT

Disclosed are processes for producing polypropylene resin compositions including two or three sorts of propylene-based polymeric materials, the processes including a first step of melt-kneading at least a propylene-α-olefin block copolymer containing a polymer portion composed mainly of propylene and a propylene-α-olefin copolymer portion having a relatively high intrinsic viscosity and a second step of melt-kneading the product of the first step with a propylene-ethylene block copolymer containing a polymer portion composed mainly of propylene and a propylene-ethylene copolymer portion having a relatively low intrinsic viscosity or a polymer portion composed mainly of propylene having a relatively low intrinsic viscosity. In the composition produced by these processes, no or substantially no fish eyes develop.

3 Claims, No Drawings

PROCESS FOR PRODUCING PROPYLENE RESIN COMPOSITION

BACKGROUND OF THE INVENTION

1. Field of the Invention

The present invention relates to processes for producing polypropylene resin compositions. More particularly, it relates to processes for producing polypropylene resin compositions in which no or substantially no fish eyes develop and from which molded articles with good appearance can be produced.

2. Description of the Related Art

Polypropylene is used in a wide variety of fields such as automotive applications, electric/electronic applications and packaging applications because of the fact that it is inexpensive and it is superior in mechanical characteristics, moldability, heat resistance, solvent resistance and appearance.

For applications which require impact resistance, propylene-ethylene block copolymers containing ethylene-propylene copolymers are used. Particularly in injection molding applications, from the viewpoints of fluidity, impact resistance and molded articles' appearance, propylene-ethylene block copolymers are used that contain a polymer portion which is composed mainly of propylene and have a relatively low molecular weight and an ethylene-propylene copolymer portion which has a relatively high molecular weight, in other words, has a high intrinsic viscosity.

However, when a propylene-ethylene block copolymer which contains an ethylene-propylene copolymer portion having a high intrinsic viscosity is produced by continuous polymerization, the ethylene-propylene copolymer portion disperses insufficiently and, as a result, fish eyes develop. Fish eyes will impair the appearance or reduce the impact resistance of molded articles.

JP 11-124439 A discloses, as a method for producing a polyolefin having less fish eyes, a technique which includes controlling the temperature and shear rate applied to a resin by means of a kneading machine when melt-kneading and pelletizing the resin.

JP 2001-150429 A discloses, as a method for inhibiting the development of fish eyes in polyolefin, a method which includes controlling separately two independently-provided devices, namely, a device for melting and a device for kneading.

It is possible to reduce fish eyes to some extent by the prior art techniques, but those techniques have not exert satisfactory effects yet and there is a demand for more improvements.

SUMMARY OF THE INVENTION

Under such circumstances, the object of the present invention is to provide processes for producing polypropylene resin compositions in which no or substantially no fish eyes develop and from which molded articles with good appearance can be produced.

In one aspect of the present invention, provided is a process for producing a polypropylene resin composition comprising 5-50% by weight of a component (I) defined below and 50-95% by weight of a component (II) defined below, the amounts in % by weight being on the basis of a total of the weight of the component (I) expressed by $W_I$ and the weight of the component (II) expressed by $W_{II}$, wherein the process comprises a 1st step and a 2nd step each defined below:

Component (I):

a propylene-α-olefin block copolymer (I) which comprises 2-65% by weight of a polymer portion (I-A) obtained by polymerizing, in a first stage, monomers mainly including propylene and 35-98% by weight of a polymer portion (I-B) obtained by polymerizing, in a second stage, propylene and α-olefin other than propylene, the amounts in % by weight being on the basis of the whole weight of the copolymer (I), wherein the content of the α-olefin contained in the polymer portion (I-B) is 10-50% by weight on the basis of the whole weight of the monomers contained in the polymer portion (I-B), and the intrinsic viscosity [η]B of the polymer portion (I-B) is not less than 3 dl/g but not more than 10 dl/g;

Component (II):

a propylene-ethylene block copolymer (II) which comprises 60-99% by weight of a polymer portion (II-A) obtained by polymerizing, in a first stage, monomers mainly including propylene and 1-40% by weight of a polymer portion (II-B) obtained by polymerizing, in a second stage, monomers including ethylene and propylene, the amounts in % by weight being on the basis of the whole weight of the copolymer (II), wherein the content of ethylene contained in the polymer portion (II-B) is 10-50% by weight on the basis of the whole weight of the monomers contained in the polymer portion (II-B), the intrinsic viscosity [η]B of the polymer portion (II-B) is not less than 1 dl/g but less than 3 dl/g, and the ratio of the intrinsic viscosity [η]B of the polymer portion (II-B) to the intrinsic viscosity [η]A of the polymer portion (II-A), [η]B/[η]A, is not less than 1 but not more than 4.5;

1st Step:

a step of melt-kneading the component (I) of an amount of $W_I$ and the component (II) of an amount less than $W_I$ together to produce an intermediate composition;

2nd Step:

a step of melt-kneading the rest of the component (II) and the intermediate composition obtained in the 1st step together to produce a final composition.

In another aspect of the present invention, provided is a process for producing a polypropylene resin composition comprising 5-50% by weight of a component (I) defined above and 50-95% by weight of a component (II) defined above, the amounts in % by weight being on the basis of a total of the weight of the component (I) expressed by $W_I$ and the weight of the component (II) expressed by $W_{II}$, wherein the process comprises a 1st step and a 2nd step each defined below:

1st Step:

a step of melt-kneading the component (I) of an amount of $W_I$ to produce a melt-kneaded material;

2nd Step:

a step of melt-kneading the component (II) of an amount of $W_{II}$ and the melt-kneaded material obtained in the 1st step together to produce a composition.

In another aspect of the present invention, provided is a process for producing a polypropylene resin composition comprising 5-50% by weight of a component (I) defined below and 50-95% by weight of a component (III) defined below, the amounts in % by weight being on the basis of a total of the weight of the component (I) expressed by $W_I$ and the weight of the component (III) expressed by $W_{III}$, wherein the process comprises a 1st step and a 2nd step each defined below:

Component (I):

a propylene-α-olefin block copolymer (I) which comprises 2-65% by weight of a polymer portion (I-A) obtained by polymerizing, in a first stage, monomers mainly including propylene and 35-98% by weight of a polymer portion (I-B) obtained by polymerizing, in a second stage, propylene and α-olefin other than propylene, the amounts in % by weight being on the basis of the whole weight of the copolymer (I), wherein the content of the α-olefin contained in the polymer portion (I-B) is 10-50% by weight on the basis of the whole weight of the monomers contained in the polymer portion (I-B), and the intrinsic viscosity [η]B of the polymer portion (I-B) is not less than 3 dl/g but not more than 10 dl/g;
Component (III):
a polymer (III) which is obtained by polymerizing monomers mainly including propylene and has an intrinsic viscosity [η] not less than 0.6 dl/g but not more than 3 dl/g;
1st Step:
a step of melt-kneading the component (I) of an amount of $W_I$ and the component (III) of an amount less than $W_I$ together to produce an intermediate composition;
2nd Step:
a step of melt-kneading the rest of the component (III) and the intermediate composition obtained in the 1st step together to produce a final composition.

In another aspect of the present invention, provided is a process for producing a polypropylene resin composition comprising 5-50% by weight of a component (I) defined above and 50-95% by weight of a component (III) defined above, the amounts in % by weight being on the basis of a total of the weight of the component (I) expressed by $W_I$ and the weight of the component (III) expressed by $W_{III}$, wherein the process comprises a 1st step and a 2nd step each defined below:
1st Step:
a step of melt-kneading the component (I) of an amount of $W_I$ to produce a melt-kneaded material;
2nd Step:
a step of melt-kneading the component (III) of an amount of $W_{III}$ and the melt-kneaded material obtained in the 1st step together to produce a composition.

In another aspect of the present invention, provided is a process for producing a polypropylene resin composition comprising 5-50% by weight of a component (I) defined below, 1-94% by weight of a component (II) defined below and 1-94% by weight of a component (III) defined below, the amounts in % by weight being on the basis of a total of the weight of the component (I) expressed by $W_I$, the weight of the component (II) expressed by $W_{II}$ and the weight of the component (III) expressed by $W_{III}$, wherein the process comprises a 1st step and a 2nd step each defined below:
Component (I):
a propylene-α-olefin block copolymer (I) which comprises 2-65% by weight of a polymer portion (I-A) obtained by polymerizing, in a first stage, monomers mainly including propylene and 35-98% by weight of a polymer portion (I-B) obtained by polymerizing, in a second stage, propylene and α-olefin other than propylene, the amounts in % by weight being on the basis of the whole weight of the copolymer (I), wherein the content of the α-olefin contained in the polymer portion (I-B) is 10-50% by weight on the basis of the whole weight of the monomers contained in the polymer portion (I-B), and the intrinsic viscosity [η]B of the polymer portion (I-B) is not less than 3 dl/g but not more than 10 dl/g;
Component (II):
a propylene-ethylene block copolymer (II) which comprises 60-99% by weight of a polymer portion (II-A) obtained by polymerizing, in a first stage, monomers mainly including propylene and 1-40% by weight of a polymer portion (II-B) obtained by polymerizing, in a second stage, monomers including ethylene and propylene, the amounts in % by weight being on the basis of the whole weight of the copolymer (II), wherein the content of ethylene contained in the polymer portion (II-B) is 10-50% by weight on the basis of the whole weight of the monomers contained in the polymer portion (II-B), the intrinsic viscosity [η]B of the polymer portion (II-B) is not less than 1 dl/g but less than 3 dl/g, and the ratio of the intrinsic viscosity [η]B of the polymer portion (II-B) to the intrinsic viscosity [η]A of the polymer portion (II-A), [η]B/[η]A, is not less than 1 dl/g but not more than 4.5;
Component (III):
a polymer (III) which is obtained by polymerizing monomers mainly including propylene and has an intrinsic viscosity [η] not less than 0.6 dl/g but not more than 3 dl/g;
1st Step:
a step of melt-kneading the component (I) of an amount of $W_I$ and the component (II) and/or the component (III) of a combined amount less than $W_I$ together to produce an intermediate composition;
2nd Step:
a step of melt-kneading the rests of the components (II) and (III) and the intermediate composition obtained in the 1st step together to produce a final composition.

In another aspect of the present invention, provided is a process for producing a polypropylene resin composition comprising 5-50% by weight of a component (I) defined above, 1-94% by weight of a component (II) defined above and 1-94% by weight of a component (III) defined above, the amounts in % by weight being on the basis of a total of the weight of the component (I) expressed by $W_I$, the weight of the component (II) expressed by $W_{II}$ and the weight of the component (III) expressed by $W_{III}$ wherein the process comprises a 1st step and a 2nd step each defined below:
1st Step:
a step of melt-kneading the component (I) of an amount of $W_I$ to produce a melt-kneaded material;
2nd step:
a step of melt-kneading the component (II) of an amount of $W_{II}$, the component (III) of an amount of $W_{III}$ and the melt-kneaded material obtained in the 1st step together to produce a composition.

By use of the methods of the present invention, it is possible to obtain polypropylene resin compositions in which no or substantially no fish eyes develop and from which molded articles with good appearance can be produced.

DETAILED DESCRIPTION OF THE PREFERRED EMBODIMENTS

The component (I) used in the present invention is a propylene-α-olefin block copolymer (I) which comprises a polymer portion (I-A) obtained by polymerizing, in a first stage, monomers mainly including propylene and a polymer portion (I-B) obtained by polymerizing, in a second stage, propylene and α-olefin other than propylene.

Regarding the contents of the polymer portion (I-A) and the polymer portion (I-B) contained in the propylene-α-olefin block copolymer (I), the content of component (I-A) is 2-65% by weight, desirably 10-60% by weight, more desirably 20-50% by weight; the content of component (I-B) is 35-98% by weight, desirably 40-90% by weight, more desirably 50-80% by weight, these contents being on the basis of the whole weight of the copolymer (I). If the component (I-B) is too less or too much, the development of fish eyes may be inhibited insufficiently.

The polymer portion (I-A) is obtained by polymerizing monomers mainly including propylene. The content of propylene in the monomers desirably is 98-100% by weight, more desirably 99-100% by weight. In view of heat resistance, rigidity and so on, the polymer portion (I-A) desirably includes propylene homopolymers having a melting point not lower than 157° C. but not higher than 170° C. and copolymers of propylene and a small amount (desirably up to 2% by weight, more desirably up to 1% by weight) of α-olefin other than propylene having a melting point not lower than 157° C. but not higher than 170° C., and more desirably propylene homopolymers having a melting point not lower than 160° C. but not higher than 168° C. Examples of the α-olefin other than propylene include ethylene and butene-1.

The content of the α-olefin other than propylene contained in the polymer portion (I-B) is 10-50% by weight, desirably 15-40% by weight on the basis of the whole weight of the monomers contained in the polymer portion (I-B). If the content of the α-olefin other than propylene is too small, the impact resistance at low temperatures may fall. If it is too large, the impact resistance at low temperatures may fall or the effect of improving flow marks may be insufficient.

From the viewpoint of the effect of improving flow marks at the time of injection molding, the intrinsic viscosity of the polymer portion (I-B), [η]B, is not lower than 3 dl/g but not higher than 10 dl/g, desirably not lower than 4 dl/g but not higher than 9 dl/g, more desirably not lower than 5 dl/g but not higher than 9 dl/g.

The propylene-α-olefin block copolymer (I) may be produced using a known polymerization catalyst and a known polymerization technique. Examples of the known catalyst include Ziegler-Natta catalysts and metallocene catalysts. Examples of the polymerization technique include slurry polymerization and gas phase polymerization.

Specific examples of the Ziegler-Natta catalysts include the catalyst systems (1) and (2) provided below:
(1) a catalyst system comprising (a) a trivalent titanium compound-containing solid catalyst component obtained by treating, with an ester compound and a mixture of an ether compound and titanium tetrachloride, a solid product obtained by reducing a titanium compound of formula: $Ti(OR^1)_n X_{4-n}$ ($R^1$ is a hydrocarbon group having 1-20 carbon atoms; X is a halogen atom; and n is a number of $0<n \leq 4$) with an organomagnesium compound in the presence of an organosilicon compound having an Si—O bond, (b) an organoaluminum compound, and (c) a silicon compound having an $Si—OR^2$ bond ($R^2$ is a hydrocarbon group having 1-20 carbon atoms);
(2) a catalyst system comprising (a) a hydrocarbyloxy group-containing solid catalyst component and (b) an organoaluminum compound, the solid catalyst component (a) being obtained by subjecting a hydrocarbon solvent-insoluble, hydrocarbyloxy group-containing solid product to prepolymerization using ethylene followed by treatment in a slurry condition at a temperature 80° C.-100° C. in the presence of an ether compound and titanium tetrachloride in a hydrocarbon solvent, the hydrocarbon solvent-insoluble, hydrocarbyloxy group-containing solid product being obtained by reducing a titanium compound of formula: $Ti(OR^1)_n X_{4-n}$ ($R^1$ is a hydrocarbon group having 1-20 carbon atoms; X is a halogen atom; and n is a number of $0<n \leq 4$) with an organoaluminum compound of formula: $AlR^2_m Y_{3-m}$ ($R^2$ is a hydrocarbon group having 1-20 carbon atoms; Y is a halogen atom; and m is a number of $1 \leq m \leq 3$).

In the catalyst system (1) or (2), the ratio of the molar number of Al atoms in the component (b) to the molar number of Ti atoms in the component (a), namely the value of [the molar number of Al atoms in component (b)]/[the molar number of Ti atoms in component (a)], is normally 1-2000, desirably 5-1500.

In addition, the ratio of the molar number of Al atoms in the component (c) to the molar number of Al atoms in the component (b), namely the value of [the molar number of Al atoms in component (c)]/[the molar number of Al atoms in component (b)], is normally 0.02-500, desirably 0.05-50.

The polymerization method used for the production of the propylene-α-olefin block copolymer (I) may be a method in which propylene and hydrogen, which is for molecular weight regulation, are fed in the substantial absence of inert solvent and the propylene is polymerized alone or the propylene and a small amount of α-olefin other than propylene are copolymerized to produce a polymer portion (I-A) in a first stage and then propylene and α-olefin other than propylene are copolymerized in a gas phase to produce a polymer portion (I-B) in a second stage. The polymerization temperature is normally 20-150° C., desirably 50-95° C. The polymerization pressure is normally from the atmospheric pressure to 40 kg/cm²G, desirably 2-40 kg/cm²G.

Component (II) used in the present invention is a propylene-ethylene block copolymer (II) which comprises a polymer portion (II-A) obtained by polymerizing, in a first stage, monomers mainly including propylene and a polymer portion (II-B) obtained by polymerizing, in a second stage, monomers including ethylene and propylene.

Regarding the contents of the polymer portion (II-A) and the polymer portion (II-B) contained in the propylene-ethylene block copolymer (II), the content of the component (II-A) is 60-99% by weight, desirably 65-95% by weight and more desirably 70-90% by weight; the content of the component (II-B) is 1-40% by weight, desirably 5-35% by weight and more desirably 10-30% by weight, these contents being on the basis of the whole weight of the copolymer (II). The inclusion of too less component (II-B) may result in loss of impact resistance, whereas the inclusion of too much component (II-B) may cause loss of rigidity or strength.

The content of ethylene contained in the polymer portion (II-B) is 10-50% by weight, desirably 15-40% by weight on the basis of the weight of the whole monomers contained in the polymer portion (II-B). If the content of ethylene contained in the polymer portion (II-B) is too small or too large, the impact resistance at low temperatures may deteriorate.

The polymer portion (II-B) has an intrinsic viscosity ([η]B) of not less than 1 dl/g but less than 3 dl/g, desirably not less than 1 dl/g but not more than 2.5 dl/g from the viewpoint of achievement of favorable fluidity at the time of molding.

The ratio of the intrinsic viscosity [η]B of the polymer portion (II-B) to the intrinsic viscosity [η]A of the polymer portion (II-A), [η]B/[η]A, is not less than 1 but not more than 4.5. A too great intrinsic viscosity ratio [η]B/[η]A may result in loss of fluidity at the time of injection molding.

The propylene-ethylene block copolymer (II) may be produced by a method similar to that used for the production of the propylene-α-olefin block copolymer (I).

The component (III) for use in the present invention is a polymer (III) obtained by polymerizing monomers mainly including propylene. The content of propylene in the monomers desirably is 98-100% by weight, more desirably 99-100% by weight.

The intrinsic viscosity ([η]) of the polymer (III) is not less than 0.6 dl/g but not more than 3 dl/g, desirably not less than 0.7 dl/g but not more than 2 dl/g, more desirably not less than 0.75 dl/g but not more than 1 dl/g. A too high intrinsic viscosity of the polymer (III) may result in loss of fluidity at the time of molding.

The polymer (III) may be produced by a method similar to that used for the production of the polymer portion (I-A) which is obtained by polymerizing monomers mainly including propylene and which is contained in the aforementioned component (I), namely, the propylene-α-olefin block copolymer (I).

One of the processes for producing polypropylene resin compositions according to the present invention is a process for producing a polypropylene resin composition comprising 5-50% by weight of component (I) and 50-95% by weight of component (II), the amounts in % by weight being on the basis of a total of the weight of the component (I) expressed by $W_I$ and the weight of the component (II) expressed by $W_{II}$, wherein the process comprises a 1st step and a 2nd step each defined below. This process is named Process [1].

Process [1]
1st Step:
a step of melt-kneading the component (I) of an amount of $W_I$ and the component (II) of an amount less than $W_I$ together to produce an intermediate composition;
2nd Step:
a step of melt-kneading the rest of the component (II) and the intermediate composition obtained in the 1st step together to produce a final composition.

If the amount of the component (II) to be used in the 1st step is equal to or greater than $W_I$, which is the weight of the whole component (I) to be used in the 1st step, the effect of reducing fish eyes may be insufficient.

The amount of the component (II) to be used in the 1st step desirably is 5% by weight or more, more desirably 5-70% by weight, even more desirably 10-70% by weight on the basis of $W_I$, the weight of the whole component (I).

Another one of the processes for producing polypropylene resin compositions according to the present invention is a process for producing a polypropylene resin composition comprising 5-50% by weight of component (I) and 50-95% by weight of component (II), the amounts in % by weight being on the basis of a total of the weight of the component (I) expressed by $W_I$ and the weight of the component (II) expressed by $W_{II}$, wherein the process comprises a 1st step and a 2nd step each defined below. This process is named Process [2].

Process [2]
1st Step:
a step of melt-kneading the component (I) of an amount of $W_I$ to produce a melt-kneaded material;
2nd Step:
a step of melt-kneading the component (II) of an amount of $W_{II}$ and the melt-kneaded material obtained in the 1st step together to produce a composition.

Another one of the processes for producing polypropylene resin compositions according to the present invention is a process for producing a polypropylene resin composition comprising 5-50% by weight of component (I) and 50-95% by weight of component (III), the amounts in by weight being on the basis of a total of the weight of the component (I) expressed by $W_I$ and the weight of the component (III) expressed by $W_{III}$, wherein the process comprises a 1st step and a 2nd step each defined below. This process is named Process [3].

Process [3]
1st Step:
a step of melt-kneading the component (I) of an amount of $W_I$ and the component (III) of an amount less than $W_I$ together to produce an intermediate composition;
2nd Step:
a step of melt-kneading the rest of the component (III) and the intermediate composition obtained in the 1st step together to produce a final composition.

If the amount of the component (III) to be used in the 1st step is equal to or greater than $W_I$, which is the weight of the whole component (I) to be used in the 1st step, the effect of reducing fish eyes may be insufficient.

The amount of the component (III) to be used in the 1st step desirably is 5% by weight or more, more desirably 5-70% by weight, even more desirably 10-70% by weight on the basis of $W_I$, the weight of the whole component (I).

Another one of the processes for producing polypropylene resin compositions according to the present invention is a process for producing a polypropylene resin composition comprising 5-50% by weight of component (I) and 50-95% by weight of component (III), the amounts in % by weight being on the basis of a total of the weight of the component (I) expressed by $W_I$ and the weight of the component (III) expressed by $W_{III}$, wherein the process comprises a 1st step and a 2nd step each defined below. This process is named Process [4].

Process [4]
1st Step:
a step of melt-kneading the component (I) of an amount of $W_I$ to produce a melt-kneaded material;
2nd Step:
a step of melt-kneading the component (III) of an amount of $W_{III}$ and the melt-kneaded material obtained in the 1st step together to produce a composition.

Another one of the processes for producing polypropylene resin compositions according to the present invention is a process for producing a polypropylene resin composition comprising 5-50% by weight of a component (I) defined above, 1-94% by weight of a component (II) defined above and 1-94% by weight of a component (III) defined above, the amounts in % by weight being on the basis of a total of the weight of the component (I) expressed by $W_I$, the weight of the component (II) expressed by $W_{II}$ and the weight of the component (III) expressed by $W_{III}$, wherein the process comprises a 1st step and a 2nd step each defined below. This process is named Process [5].

Process [5]
1st Step:
a step of melt-kneading the component (I) of an amount of $W_I$ and the component (II) and/or the component (III) of a combined amount less than $W_I$ together to produce an intermediate composition;
2nd Step:
a step of melt-kneading the rests of the components (II) and (III) and the intermediate composition obtained in the 1st step together to produce a final composition.

If the combined amount of the components (II) and (III) to be used in the 1st step is equal to or greater than $W_I$, which is the weight of the whole component (I) to be used in the 1st step, the effect of reducing fish eyes may be insufficient.

The combined amount of the components (II) and (III) to be used in the 1st step desirably is 5% by weight or more, more desirably 5-70% by weight, even more desirably 10-70% by weight on the basis of $W_I$, the weight of the whole component (I).

Another one of the processes for producing polypropylene resin compositions according to the present invention is a process for producing a polypropylene resin composition comprising 5-50% by weight of a component (I) defined above, 1-94% by weight of a component (II) defined above and 1-94% by weight of a component (III) defined above, the amounts in % by weight being on the basis of a total of the weight of the component (I) expressed by $W_I$, the weight of the component (II) expressed by $W_{II}$ and the weight of the component (III) expressed by $W_{III}$, wherein the process comprises a 1st step and a 2nd step each defined below. This process is named Process [6].

Process [6]
1st Step:
a step of melt-kneading the component (I) of an amount of $W_I$ to produce a melt-kneaded material;

2nd Step:

a step of melt-kneading the component (II) of an amount of $W_{II}$ and the component (III) of an amount of $W_{III}$ and the melt-kneaded material obtained in the 1st step together to produce a composition.

Examples of the melt-kneading device for use in the processes according to the present invention include a Banbury mixer, a plastomill, a Brabender, a plastograph, a single screw extruder and a twin screw extruder.

In Process [1] above, the melt-kneading may be carried out, for example, by any of the following methods (1)-(3).

(1) A method in which a product (molten material) obtained by melt-kneading is once solidified to form an intermediate composition in a solidified state in the 1st step and then the solidified intermediate composition and the rest of component (II) are melt-kneaded in the 2nd step.

(2) A method in which a product (molten material) obtained by melt-kneading is not solidified to form an intermediate composition in an unsolidified state in the 1st step and then the unsolidified intermediate composition and the rest of component (II) are melt-kneaded in the 2nd step.

(3) A method in which a product (molten material) obtained by melt-kneading is once solidified to form an intermediate composition in a solidified state in the 1st step and then the solidified intermediate composition is once molten and the molten intermediate composition and the rest of component (II) are melt-kneaded in the 2nd step.

From the viewpoint of the effect of reducing fish eyes, method (2) is preferred among those methods.

In view of production efficiency, a preferred embodiment of Process [1] mentioned above is a process using an extruder with two or more feed ports wherein the whole amount ($W_I$) of component (I) and component (II) of a weight less than $W_I$ are fed through a 1st feed port located on the upstream side and are melt-kneaded to form a melt-kneaded material in the 1st step and then, in the 2nd step, the rest of component (II) is fed through a 2nd feed port located on the downstream side and the melt-kneaded material obtained in the 1st step and the additional component (II) are melt-kneaded together to form a final composition.

A preferred embodiment of Process [2] mentioned above is a process using an extruder with two or more feed ports wherein the whole amount ($W_I$) of component (I) is fed through a 1st feed port located on the upstream side and is melt-kneaded to form a melt-kneaded material in the 1st step and then, in the 2nd step, the whole amount ($W_{II}$) of component (II) is fed through a 2nd feed port located on the downstream side and the melt-kneaded material obtained in the 1st step and the component (II) are melt-kneaded together to form a composition.

Likewise, in the case of producing a polypropylene resin composition containing components (I) and (III), a preferred embodiment of Process [3] is a method in which a product (molten material) obtained by melt-kneading is not solidified to form an intermediate composition in an unsolidified state in the 1st step and then the unsolidified intermediate composition and the rest of component (III) are melt-kneaded together in the 2nd step.

A preferred embodiment of Process [3] mentioned above is a process using an extruder with two or more feed ports wherein the whole amount ($W_I$) of component (I) and component (III) of a weight less than $W_I$ are fed through a 1st feed port located on the upstream side and are melt-kneaded to form a melt-kneaded material in the 1st step and then, in the 2nd step, the rest of component (III) is fed through a 2nd feed port located on the downstream side and the melt-kneaded material obtained in the 1st step and the additional component (III) are melt-kneaded together to form a final composition.

A preferred embodiment of Process [4] mentioned above is a process using an extruder with two or more feed ports wherein the whole amount ($W_I$) of component (I) is fed through a 1st feed port located on the upstream side and is melt-kneaded to form a melt-kneaded material in the 1st step and then, in the 2nd step, the whole amount ($W_{III}$) of component (III) is fed through a 2nd feed port located on the downstream side and the melt-kneaded material obtained in the 1st step and the component (III) are melt-kneaded together to form a composition.

Likewise, in the case of producing a polypropylene resin composition containing components (I), (II) and (III), a preferred embodiment of Process [5] is a method in which a product (molten material) obtained by melt-kneading is not solidified to form an intermediate composition in an unsolidified state in the 1st step and then the unsolidified intermediate composition and the rests of components (II) and (III) are melt-kneaded together in the 2nd step.

A preferred embodiment of Process [5] mentioned above is a process using an extruder with two or more feed ports wherein the whole amount ($W_I$) of component (I) and component (II) and/or component (III) of a combined weight less than $W_I$ are fed through a 1st feed port located on the upstream side and are melt-kneaded to form an intermediate composition in the 1st step and then, in the 2nd step, the rest of components (II) and (III), if any, are fed through a 2nd feed port located on the downstream side and the intermediate composition obtained in the 1st step and the additional components (II) and (III) are melt-kneaded together to form a composition.

A preferred embodiment of Process [6] mentioned above is a process using an extruder with two or more feed ports wherein the whole amount ($W_I$) of component (I) is fed through a 1st feed port located on the upstream side and is melt-kneaded to form a melt-kneaded material in the 1st step and then, in the 2nd step, the whole amount ($W_{II}$) of component (II) and the whole amount ($W_{III}$) of component (III) are fed through a 2nd feed port located on the downstream side and the melt-kneaded material obtained in the 1st step and the components (II) and (III) are melt-kneaded together to form a composition.

When melt-kneading is conducted using an extruder, a screen may, if necessary, be mounted to a die of the extruder. The screen to be mounted preferably is a sintered metal fiber filter, examples of which are disclosed in "Mechanical Design" Vol. 25, No. 3, pp. 109-113, March 1981.

The temperature of the cylinder of the extruder is set normally within the range from 100° C. to 250° C., desirably within the range from 130° C. to 230° C. The temperature of the resin immediately after its extrusion through the die of the extruder is normally within the range from 180° C. to 270° C., desirably within the range from 180° C. to 240° C.

In the polypropylene resin compositions obtained by the processes according to the present invention, filler may be incorporated for a purpose of, for example, reinforcement of the compositions, impartation of functions to the compositions, cost reduction of the compositions, etc.

Examples of the filler include talc, mica, silica, alumina, calcium carbonate, clay, kaolin, wollastonite, magnesium sulfate, titanium oxide, zinc oxide, antimony trioxide, glass fiber, carbon fiber, polyamide fiber, aluminum fiber and stainless fiber.

In the polypropylene resin compositions obtained by the processes according to the present invention, other thermoplastic resins as impact resistance modifiers or the like, antioxidants, UV absorbers, antistatic agents, anticlouding agents, lubricants, antiblocking agents, nucleating agents and pigments may be incorporated, if needed.

EXAMPLES

Hereinafter, the present invention will be illustrated by making reference to Examples and Comparative Examples, which do not limit the scope of the present invention in any way.

The methods for measuring physical properties are shown below.

(1) Measurement of the Number of Fish Eyes

Using a thermoplastic resin obtained by melt-kneading, a film 50 mm in width and 50 μm in thickness was produced by use of a 20-mmφ single screw extruder (V-20 manufactured by Tanabe Plastic Kikai K.K.) and a haul-off device.

Images (900 dpi, 8 bit) of the resulting film were captured into a computer by a scanner GT-9600 manufactured by EPSON, and the images were binarized by means of image analysis software, A zo-kun available from Asahi Engineering Co., Ltd. Fish eyes were recognized as areas brighter than surrounding areas. Because the fish eyes had irregular forms, the diameter of a circle having the same area as that of a fish eye was used as the size of the fish eye, and the number of fish eyes having a diameter of 200 μm or more per 100 cm² of the film was counted.

(2) Melt Flow Rate (MFR; g/10 min.)

The MFR was measured in accordance with JIS K 6758 under conditions including a temperature of 230° C. and a load of 21 N.

(3) Weight Ratio (X; by Weight) of Propylene-Ethylene Copolymer Portion (Component B) to the Whole Propylene-Ethylene Block Copolymer; and Ethylene Content [(C2') EP; % by Weight] of the Propylene-Ethylene Copolymer Portion (Component B) in the Propylene-Ethylene Block Copolymer The above characteristic values were calculated from a $^{13}$C-NMR spectrum measured according to the Report of Kakugo, et al. (Macromolecules, 15, 1150-1152 (1982)).

In a test tube having a diameter of 10 mm, about 200 mg of propylene-ethylene block copolymer was dissolved uniformly in 3 ml of o-dichlorobenzene to yield a sample solution, and the sample solution was subjected to $^{13}$C-NMR analysis under the following conditions:

Temperature: 135° C.
Pulse repeating time: 10 seconds
Pulse width: 45°
Accumulation number: 2500 times (4) Intrinsic Viscosity ([η]A; dl/g) of Polymer Portion (A) Composed Mainly of Propylene and Intrinsic Viscosity ([η] B; dl/g) of Ethylene-Propylene Copolymer Portion (B) in Propylene-Ethylene Block Copolymer The intrinsic viscosity ([η]A; dl/g) of the polymer portion (A) composed mainly of propylene in a propylene-ethylene block copolymer and the intrinsic viscosity ([η]B; dl/g) of the ethylene-propylene copolymer portion (B) were calculated using the following formula on the basis of the measurements of the intrinsic viscosities of the propylene polymer portion (A) and the whole block copolymer.

$$[\eta]B = [\eta]T/X - (1/X-1)[\eta]A$$

[η]T is an intrinsic viscosity (dl/g) of the whole propylene-ethylene block copolymer.

To measure the intrinsic viscosity [η]A of a polymer portion (A) composed mainly of propylene in the propylene-ethylene block copolymer, the polymer portion (A) composed mainly of propylene was sampled from the polymerization reactor just after the first stage for preparing the polymer portion (A) composed mainly of propylene and then the intrinsic viscosity [η]A of the sampled polymer composed mainly of propylene was measured.

(Samples)

(I-1) Propylene-Ethylene Block Copolymer (Component (I))

Propylene-ethylene block copolymer which has an MFR of 0.05 g/10 min., and comprises a propylene homopolymer portion having an intrinsic viscosity [η]A of 0.97 dl/g and a propylene-ethylene copolymer portion having an intrinsic viscosity [η]B of 8.4 dl/g, a weight ratio to the whole propylene-ethylene block copolymer of 72% by weight and an ethylene content of 34% by weight. The block copolymer had an intrinsic viscosity of 6.3.

(I-2) Propylene-Ethylene Block Copolymer (Component (I))

Propylene-ethylene block copolymer which has an MFR of 1.4 g/10 min., and comprises a propylene homopolymer portion having an intrinsic viscosity [η]A of 0.92 dl/g and a propylene-ethylene copolymer portion having an intrinsic viscosity [η]B of 5.6 dl/g, a weight ratio to the whole propylene-ethylene block copolymer of 44% by weight and an ethylene content of 34% by weight.

(I-3) Propylene-Ethylene Block Copolymer (Component (I))

Propylene-ethylene block copolymer which has an MFR of 5.5 g/10 min., and comprises a propylene homopolymer portion having an intrinsic viscosity [η]A of 0.92 dl/g and a propylene-ethylene copolymer portion having an intrinsic viscosity [η]B of 5.6 dl/g, a weight ratio to the whole propylene-ethylene block copolymer of 38% by weight and an ethylene content of 32% by weight. The block copolymer had an intrinsic viscosity of 3.0.

(II-1) Propylene-Ethylene Block Copolymer (Component (II))

Propylene-ethylene block copolymer which has an MFR of 45 g/10 min., and comprises a propylene homopolymer portion having an intrinsic viscosity [η]A of 0.92 dl/g and a propylene-ethylene copolymer portion having an intrinsic viscosity [η]B of 2.41 dl/g, a weight ratio to the whole propylene-ethylene block copolymer of 26% by weight and an ethylene content of 45% by weight. The block copolymer had an intrinsic viscosity of 1.3.

(II-2) Propylene-Ethylene Block Copolymer (Component (II))

Propylene-ethylene block copolymer which has an MFR of 24 g/10 min., and comprises a propylene homopolymer portion having an intrinsic viscosity [η]A of 0.92 dl/g and a propylene-ethylene copolymer portion having an intrinsic viscosity [η]B of 8.0 dl/g, a weight ratio to the whole propylene-ethylene block copolymer of 26% by weight and an ethylene content of 45% by weight. The block copolymer had an intrinsic viscosity of 2.8.

(III-1) Propylene Homopolymer (Component (III))

Propylene homopolymer having an MFR of 120 g/10 min. and an intrinsic viscosity [η]A of 0.9 dl/g.

(III-2) Propylene Homopolymer (Component (III))

Propylene homopolymer having an MFR of 320 g/10 min. and an intrinsic viscosity [η] A of 0.8 dl/g.

Example 1

A twin screw extruder (TEM-50A, manufactured by TOSHIBA MACHINE Co., Ltd.) having three feed ports was provided. The components shown in Table 1 were fed into the extruder through the predetermined feed ports, respectively. In the extruder, melt-kneading and extrusion were conducted under conditions including a cylinder temperature 150° C., a screw speed 200 rpm and a discharge rate of 30 kg/hr. The strand extruded was cooled in a water bath and then was pelletized by a pelletizer. The feed ports are called 1st feed port, 2nd feed port and 3rd feed port, respectively, in order from the upstream side of the extruder. The extruder was equipped with, as a screen pack, a sintered metal fiber filter (NF14N, manufactured by Nippon Seisen Co., Ltd.).

Using the resulting pellets, a film 50 μm in thickness was prepared by means of a 20 mmφ single screw extruder. Then, the number of fish eyes in the film was counted.

The results are shown in Table 1.

Examples 2 to 8

The procedure of Example 1 was repeated except that the components shown in Table 1 or 2 were fed into the extruder in the order provided in Table 1 or 2. The results are shown in Table 1 or 2.

Comparative Examples 1 to 6

The procedure of Example 1 was repeated except that the components shown in Table 3 or 4 were fed into the extruder in the order provided in Table 3 or 4. The results are shown in Table 3 or 4.

In Examples 1 to 8, where the kneading methods of the present invention were used, the numbers of fish eyes are smaller in comparison to Comparative Examples 1 to 6, where kneading methods beyond the present invention were used.

TABLE 1

|  | Example 1 | Example 2 | Example 3 | Example 4 |
|---|---|---|---|---|
| 1st feed port Component name (amount) | I-1 (18) | I-1 (18) | I-1 (18) | I-1 (18) III-1 (6) |
| 2nd feed port Component name (amount) | II-1 (82) | III-1 (82) | III-1 (16) | III-1 (26) |
| 3rd feed port Component name (amount) | — | — | III-1 (66) | III-1 (50) |
| The number of FE (fish eyes/100 cm$^2$) | 0 | 0 | 0 | 48 |

TABLE 2

|  | Example 5 | Example 6 | Example 7 | Example 8 |
|---|---|---|---|---|
| 1st feed port Component name (amount) | I-1 (10) I-2 (14) | I-3 (34) | I-1 (18) | I-1 (18) III-1 (6) |
| 2nd feed port Component name (amount) | III-1 (26) | III-1 (66) | III-2 (82) | III-1 (76) |
| 3rd feed port Component name (amount) | III-1 (50) | — | — | — |
| The number of FE (fish eyes/100 cm$^2$) | 39 | 29 | 10 | 50 |

TABLE 3

|  | Comparative Example 1 | Comparative Example 2 | Comparative Example 3 |
|---|---|---|---|
| 1st feed port Component name (amount) | I-1 (18) II-1 (82) | I-1 (18) III-1 (82) | I-3 (34) III-1 (66) |

TABLE 3-continued

|  | Comparative Example 1 | Comparative Example 2 | Comparative Example 3 |
|---|---|---|---|
| 2nd feed port Component name (amount) | — | — | — |
| 3rd feed port Component name (amount) | — | — | — |
| The number of FE (fish eyes/100 cm$^2$) | 400 | 608 | 318 |

TABLE 4

|  | Comparative Example 4 | Comparative Example 5 | Comparative Example 6 |
|---|---|---|---|
| 1st feed port Component name (amount) | I-1 (18) III-2 (82) | II-2 (50) III-1 (25) | II-2 (25) III-1 (25) |
| 2nd feed port Component name (amount) | — | III-1 (25) | III-1 (50) |
| 3rd feed port Component name (amount) | — | — | — |
| The number of FE (fish eyes/100 cm$^2$) | 2330 | 2000 | 1500 |

What is claimed is:

1. A process for producing a polypropylene resin composition comprising 5-50% by weight of a component (I) defined below and 50-95% by weight of a component (II) defined below, the amounts in % by weight being on the basis of a total of the weight of the component (I) expressed by $W_I$ and the weight of the component (II) expressed by $W_{II}$, wherein the process comprises a 1st step and a 2nd step each defined below:

component (I):
a propylene-α-olefin block copolymer (I) which consists of 2-65% by weight of a polymer portion (I-A) obtained by polymerizing, in a first stage, monomers mainly including propylene and 35-98% by weight of a polymer portion (I-B) obtained by polymerizing, in a second stage, propylene and α-olefin other than propylene, the amounts in % by weight being on the basis of the whole weight of the copolymer (I), wherein the content of the α-olefin contained in the polymer portion (I-B) is 10-50% by weight on the basis of the whole weight of the monomers contained in the polymer portion (I-B), and the intrinsic viscosity [η] B of the polymer portion (I-B) is not less than 4 dl/g but not more than 10 dl/g;

component (II):
a propylene-ethylene block copolymer (II) which comprises 60-99% by weight of a polymer portion (II-A) obtained by polymerizing, in a first stage, monomers mainly including propylene and 1-40% by weight of a polymer portion (II-B) obtained by polymerizing, in a second stage, monomers including ethylene and propylene, the amounts in % by weight being on the basis of the whole weight of the copolymer (II), wherein the content of ethylene contained in the polymer portion (II-B) is 10-50% by weight on the basis of the whole weight of the monomers contained in the polymer portion (II-B), the intrinsic viscosity [η] B of the polymer portion (II-B) is not less than 1 dl/g but less than 3 dl/g, and the ratio of the intrinsic viscosity [η]B of the polymer portion (II-B) to the intrinsic viscosity [η]A of the polymer portion (II-A), [η]B/[η]A, is not less than 1 but not more than 4.5;

1st step:
a step of melt-kneading the component (I) of an amount of $W_I$ and the component (II) of an amount less than $W_I$ together to produce an intermediate composition;

2nd step:
a step of melt-kneading the rest of the component (II) and the intermediate composition obtained in the 1st step together to produce a final composition.

2. The process according to claim 1, wherein in the 1st step a product resulting from the melt-kneading is not solidified to form the intermediate composition in an unsolidified state and in the 2nd step the rest of the component (II) and the unsolidified intermediate composition are combined.

3. A process for producing a polypropylene resin composition comprising 5-50% by weight of a component (I) defined below and 50-95% by weight of a component (II) defined below, the amounts in % by weight being on the basis of a total of the weight of the component (I) expressed by $W_I$ and the weight of the component (II) expressed by $W_{II}$, wherein the process comprises a 1st step and a 2nd step each defined below:

component (I):
a propylene-α-olefin block copolymer (I) which consists of 2-65% by weight of a polymer portion (I-A) obtained by polymerizing, in a first stage, monomers mainly including propylene and 35-98% by weight of a polymer portion (I-B) obtained by polymerizing, in a second stage, propylene and α-olefin other than propylene, the amounts in % by weight being on the basis of the whole weight of the copolymer (I), wherein the content of the α-olefin contained in the polymer portion (I-B) is 10-50% by weight on the basis of the whole weight of the monomers contained in the polymer portion (I-B), and the intrinsic viscosity [η]B of the polymer portion (I-B) is not less than 4 dl/g but not more than 10 dl/g;

component (II):
a propylene-ethylene block copolymer (II) which comprises 60-99% by weight of a polymer portion (II-A) obtained by polymerizing, in a first stage, monomers mainly including propylene and 1-40% by weight of a polymer portion (II-B) obtained by polymerizing, in a second stage, monomers including ethylene and propylene, the amounts in % by weight being on the basis of the whole weight of the copolymer (II), wherein the content of ethylene contained in the polymer portion (II-B) is 10-50% by weight on the basis of the whole weight of the monomers contained in the polymer portion (II-B) the intrinsic viscosity [η]B of the polymer portion (II-B) is not less than 1 dl/g but less than 3 dl/g, and the ratio of the intrinsic viscosity [η]B of the polymer portion (II-B) to the intrinsic viscosity [η]A of the polymer portion (II-A), [η]B/[η]A, is not less than 1 but not more than 4.5;

1st step:
a step of melt-kneading the component (I) of an amount of $W_I$ to produce a melt-kneaded material;

2nd step:
a step of melt-kneading the component (II) of an amount of $W_{II}$ and the melt-kneaded material obtained in the 1st step together to produce a composition.

* * * * *